US012202121B2

United States Patent
Ueyama et al.

(10) Patent No.: US 12,202,121 B2
(45) Date of Patent: Jan. 21, 2025

(54) ROBOT (71) Applicant: HONDA MOTOR CO., LTD., Tokyo (JP)

(72) Inventors: Masaki Ueyama, Wako (JP); Hiroki Mukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 17/453,724

(22) Filed: Nov. 5, 2021

(65) Prior Publication Data

US 2022/0152836 A1   May 19, 2022

(30) Foreign Application Priority Data

Nov. 13, 2020   (JP) .................................. 2020-189627

(51) Int. Cl.
*B25J 9/00* (2006.01)
*B25J 5/00* (2006.01)
*B25J 9/16* (2006.01)
*B25J 11/00* (2006.01)

(52) U.S. Cl.
CPC ........... *B25J 11/0005* (2013.01); *B25J 5/007* (2013.01); *B25J 9/1664* (2013.01); *B25J 9/1697* (2013.01)

(58) Field of Classification Search
CPC ...... B25J 11/0005; B25J 5/007; B25J 9/1664; B25J 9/1697; B25J 5/00; B25J 9/0084; B25J 13/06; G05D 1/0011
See application file for complete search history.

(56) References Cited

U.S. PATENT DOCUMENTS

| 2012/0265391 A1* | 10/2012 | Letsky | G05D 1/0088 |
| | | | 701/25 |
| 2018/0373239 A1* | 12/2018 | Tsubota | B25J 11/008 |
| 2018/0373852 A1* | 12/2018 | Tsubota | G05D 1/0055 |
| 2019/0364114 A1* | 11/2019 | Tokuchi | H04L 67/141 |
| 2021/0031385 A1* | 2/2021 | Rembisz | G05D 1/024 |
| 2021/0048829 A1* | 2/2021 | Deyle | G06V 40/16 |
| 2021/0114218 A1* | 4/2021 | Kim | G05D 1/0214 |
| 2021/0129344 A1* | 5/2021 | Yeom | G05D 1/0276 |

FOREIGN PATENT DOCUMENTS

JP  2014-506023  3/2014

* cited by examiner

*Primary Examiner* — Khoi H Tran
*Assistant Examiner* — Tien Minh Le
(74) *Attorney, Agent, or Firm* — Rankin, Hill & Clark LLP

(57) ABSTRACT

A robot includes: a communication unit that receives a remote operation instruction by a user terminal of a user; a body unit capable of traveling; a head unit attached to the body unit and capable of changing a direction; a camera; a control unit that controls the body unit, the head unit, and the camera, based on the operation instruction; and an operation switching input unit that switches between the operation instruction by the user terminal of the user and an operation instruction by a facility terminal of a facility user, and when switching the operation instruction, the operation switching input unit requests the user for whether to approve user switching, and when the user approves the user switching of the operation instruction via the user terminal, the operation switching input unit switches the operation instruction by the user terminal to the operation instruction by the facility terminal.

8 Claims, 3 Drawing Sheets

ROBOT

INCORPORATION BY REFERENCE

The present application claims priority under 35 U.S.C. § 119 to Japanese Patent Application No. 2020-189627 filed on Nov. 13, 2020. The content of the application is incorporated herein by reference in its entirety.

BACKGROUND

Technical Field

The present invention relates to a robot.

Related Art

In these years, telepresence robots, in which video conference technology, remote operation technology, and robot technology are combined together, attract attention. A mobile type of the telepresence robots, which participates in a conference or moves in various places as a virtual avatar of a user who is a communication source, has also been proposed.

As such a telepresence robot, there has conventionally been disclosed a configuration including an exchangeable head attachment device that supports a display, a microphone, a camera, a tablet PC, and a smartphone device, a base (foundation) movable in any direction on omnidirectional wheels, and an intermediate part module into which a laser pointer and a 360 degree 2D or 3D camera apparatus are incorporated. Communication is enabled between a remote PC or a tablet and the robot, so that remote processes for a motor drive unit, an ultrasonic sensor, and a panoramic camera, and other processes in the robot can be performed from the tablet (see, for example, JP 2014-506023 A).

SUMMARY

In the technique of JP 2014-506023 A, however, only the user of the communication source is able to remotely operate the robot.

However, for example, in a facility or the like, it is more convenient, in some cases, for a facility manager or a guide person of the facility (hereinafter, referred to as a facility user) to operate the robot because the facility user has enough knowledge of passages, exhibition items, and the like of the facility.

In such cases, when the facility user switches an operation of the robot without permission, the robot is operated against a user's intention. This may be inconvenient for the user.

In addition, in a case where an emergency occurs in a facility, there is a problem in that a robot traveling on a passage or the like becomes an obstacle, and people in the facility are not able to evacuate quickly.

Therefore, the present invention has been made in view of the above-described circumstances, and has an object to provide a robot, an operation of which is switchable from a user to a facility user, which enables an improvement in usability, and which is capable of properly handling an emergency situation in a facility, in a case where a configuration provided with a telepresence robot is used in the facility.

In order to achieve the above-described object, a robot according to an aspect of the present invention includes: a communication unit that receives a remote operation instruction by a user terminal of a user; a body unit capable of traveling; a head unit attached to the body unit and capable of changing a direction; an image-capturing unit; a control unit that controls the body unit, the head unit, and the image-capturing unit, based on the operation instruction that has been received by the communication unit; and an operation switching input unit that switches between the operation instruction by the user terminal of the user and an operation instruction by another user terminal of another user, and when switching the operation instruction, the operation switching input unit requests the user for whether to approve user switching, and when the user approves the user switching of the operation instruction via the user terminal, the operation switching input unit switches the operation instruction by the user terminal to the operation instruction by the another user terminal.

In the above configuration, in a case where the operation instruction is switched to the another user terminal of the another user, the operation instruction is transmittable from the another user terminal of the another user to a plurality of the robots, and the plurality of the robots are capable of acting in cooperation with each other.

In the above configuration, the image-capturing unit is attached to the head unit, and the control unit receives an action instruction for the head unit from the user terminal, also in a case where the operation instruction is switched to the another user terminal.

In the above configuration, in a case where the operation instruction is switched to the another user terminal, the control unit recognizes either the another user or another robot to travel to follow, based on a captured image that has been captured by the image-capturing unit, and controls traveling to follow.

In the above configuration, the control unit registers either the another user or the another robot beforehand, based on the captured image of either the another user or the another robot that has been captured by the image-capturing unit, and when the operation instruction is switched to the another user terminal, in a case where either the another user or the another robot based on the captured image that has been captured by the image-capturing unit matches either the another user or the another robot that has been registered beforehand, the control unit controls traveling to follow either the another user or the another robot.

In the above configuration, the control unit reads an ID owned by either the another user or the another robot to recognize either the another user or the another robot, and controls traveling to follow either the another user or the another robot.

In the above configuration, when the operation switching of the another user terminal is cancelled on the operation switching input unit, the control unit ends an operation by the another user terminal, and automatically switches to an operation by the user terminal of the user.

In the above configuration, an emergency switch is further included, and when the emergency switch is operated, the control unit controls traveling autonomously to a predetermined sheltering place without obtaining an approval of the operation switching from the user.

In the above configuration, when the emergency switch of one robot is operated, another robot acts in cooperation to ensure an evacuation passage, travels autonomously to a sheltering place while ensuring the evacuation passage, and holds a sheltering state at the sheltering place.

In the above configuration, the control unit acquires map information beforehand, and the control unit registers the sheltering place beforehand.

In the above configuration, the control unit sets the sheltering place along a wall closest to a current location.

In the above configuration, the control unit registers an evacuation passage for people, and sets the sheltering place along the wall other than the evacuation passage.

According to the aspect of the present invention, when the operation instruction is switched to another user terminal, the approval of the user is obtained. Therefore, it is possible to prevent the operation instruction from being switched from the user to another user without permission. In addition, another user is able to operate another user terminal in a facility. Therefore, another user who has enough knowledge of the facility can be made to operate the robot, so that the user can view and observe the inside of the facility via the robot operated by another user.

In addition, by operating the emergency switch, the robot can be sheltered to a predetermined sheltering place, and it is possible to prevent the robot from obstructing evacuation of people at the time of an emergency.

DETAILED DESCRIPTION

Hereinafter, embodiments of the present invention will be described with reference to the drawings.

Figure 1:
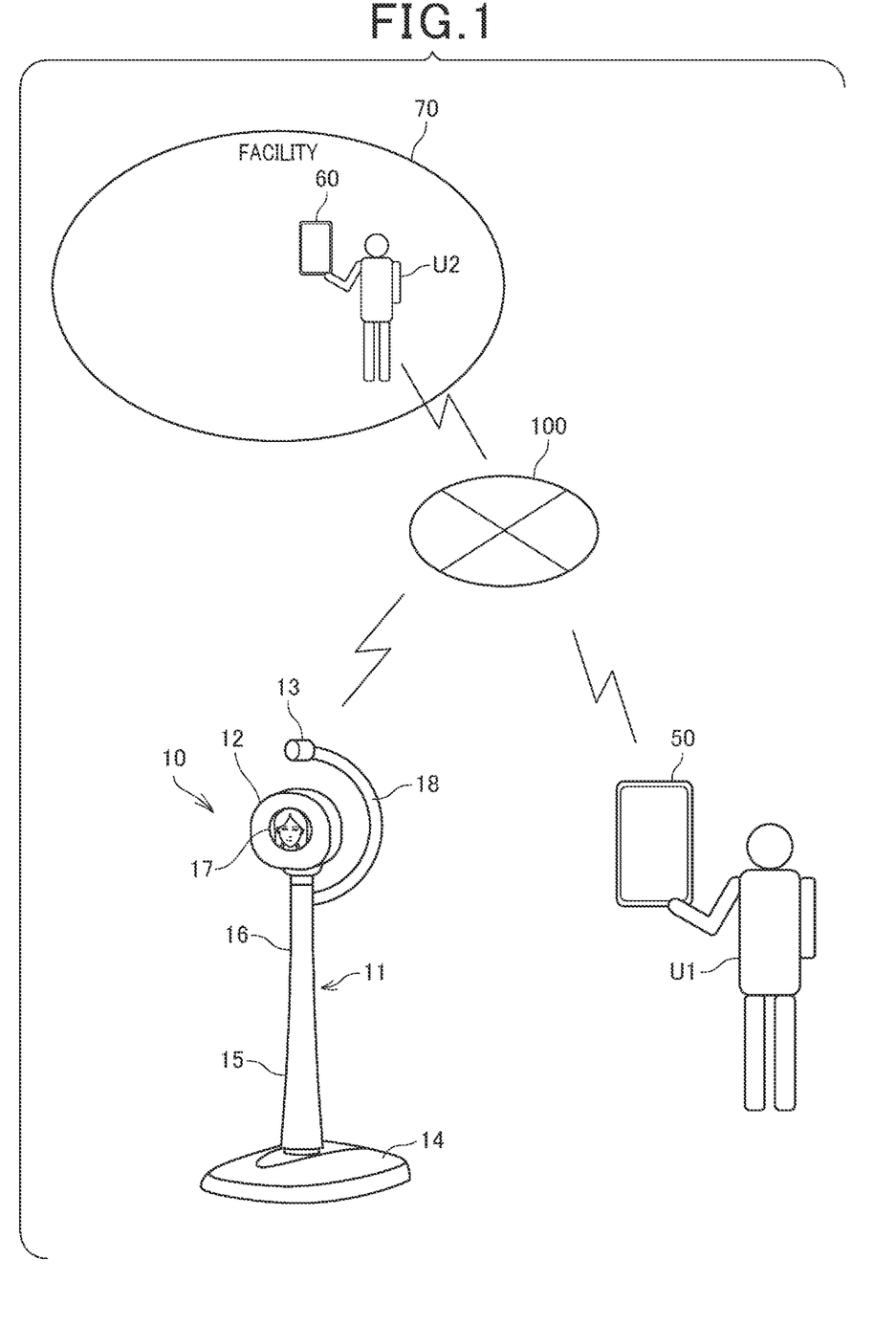
FIG. 1 is a schematic configuration diagram illustrating an embodiment of a remote operation system to which a robot according to the present invention is applied.

FIG. 1 illustrates a remote operation system including a robot according to an embodiment of the present invention.

A robot 10 used in the remote operation system is the robot 10, which is categorized as a telepresence robot in which the video conference technology, the remote operation technology, and the robot technology are combined together. The robot 10 has a communicating function for communicating with a user terminal 50 operated by a user U1 at a remote location through a communication network 100, a traveling function, an image-capturing function, a displaying function, and the like.

The user terminal 50 is a computer device such as a personal computer, a smartphone, or a tablet, and functions as a remote operation device for the robot 10 by a predetermined application program being installed.

As illustrated in FIG. 1, the robot 10 includes a robot main body 11, a head unit 12 attached to an upper part of the robot main body 11, and a camera 13 as an image-capturing unit capable of capturing an image of a side that the front surface of the head unit 12 faces.

The robot main body 11 includes a traveling unit 14 functioning as a moving unit for moving the robot 10, a body unit 15 extending upward from the traveling unit 14, and a neck unit 16 extending at a top part of the body unit 15.

The traveling unit 14 includes a plurality of wheels (not illustrated), and is capable of traveling forward, backward, leftward, and rightward, when a direction of each wheel or a driving direction is controlled. It is sufficient if a known traveling unit is applied to the traveling unit 14. For example, it is sufficient if a configuration in which a steering wheel and a drive wheel are separately provided or a configuration in which left and right wheels are independently driven to be capable of moving forward, backward, leftward, and rightward is applied.

The neck unit 16 is formed in a single support column shape, and is supported by the body unit 15 to be extensible vertically and rotatable laterally.

The head unit 12 is supported by an upper end of the neck unit 16, and moves vertically or rotates laterally to be integral with the neck unit 16 in accordance with an actuation of the neck unit 16. A front surface of the head unit 12 is provided with a display unit 17 (display) including a known display panel. FIG. 1 illustrates a case where a face image of the user U1 is displayed on the display unit 17.

The neck unit 16 is coupled with a coupling member 18 extending from the neck unit 16 to an upper side of the head unit 12 through a back side of the head unit 12. The camera 13 is supported at a tip end of the coupling member 18, so that the camera 13 is arranged to be capable of capturing an image of the side that the front surface of the head unit 12 faces.

The camera 13 is disposed above the head unit 12. Thus, for example, in a case where the height of the head unit 12 of the robot 10 is lower than a head position of an average person, the camera 13 can be disposed at a position close to the face of a person near the robot 10 to be capable of easily capturing an image of the person's face.

In this configuration, the robot 10 is formed in a shape including the traveling unit 14, a single neck unit 16, a single head unit 12, and a single coupling member 18 extending from the neck unit 16 and supporting the camera 13. Therefore, a part above the traveling unit 14 is made laterally compact, and a simple external appearance shape is achieved. In addition, the shape is also advantageous for reducing the number of component parts and costs.

Note that the shape of the robot 10 may be changed. For example, the camera 13 may be disposed on the neck unit 16 or the head unit 12, as long as it is within a range in which an image of the side that the front surface of the head unit 12 faces can be captured. In addition, the head unit 12 is formed in a round shape in a front view, but the present invention is not limited to this. The head unit 12 may be formed in a rectangular shape or the like in a front view.

Figure 2:
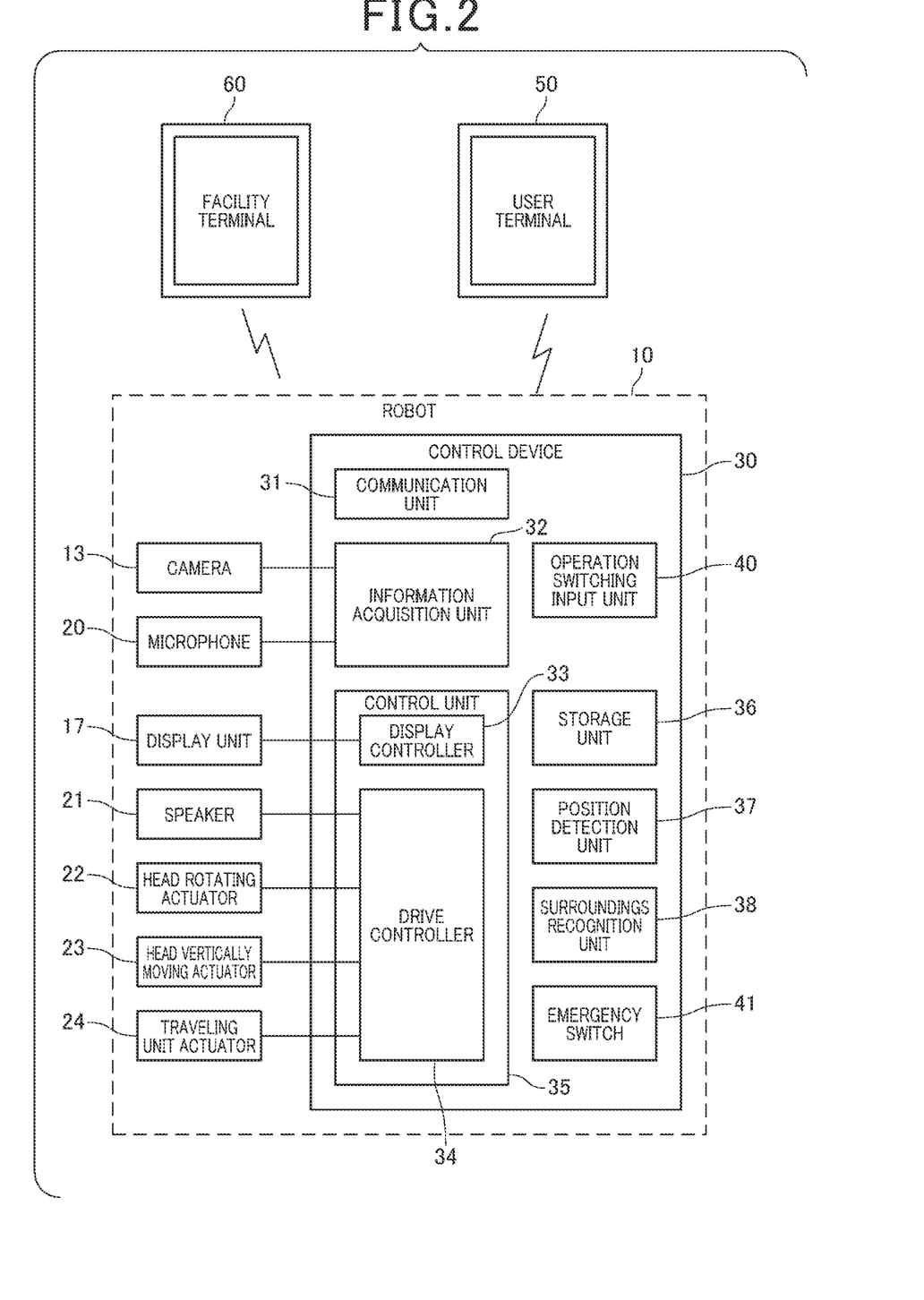
FIG. 2 is a block diagram illustrating a functional configuration of the robot according to the present embodiment.

FIG. 2 is a block diagram illustrating a functional configuration of the robot 10.

The robot 10 includes a camera 13, a microphone 20, the display unit 17, a speaker 21, a head rotating actuator 22, a head vertically moving actuator 23, a traveling unit actuator 24, and a control device 30. The camera 13 outputs image-captured data indicating a captured image. The camera 13 is made to face the side that the front surface of the head unit 12 faces, and is thus capable of capturing an image of at least a scene, a person, another robot 10, and the like on the front surface side of the head unit 12.

Note that a wide-angle or ultra-wide-angle camera 13 may be applied to the camera 13, so that an image-captured range may be expanded vertically and laterally. In addition, a configuration including a plurality of the cameras 13 may be applicable.

The microphone 20 collects sounds around the robot 10, and outputs sound data indicating the sounds that have been collected. For example, the microphone 20 is disposed on a front surface of the head unit 12 or the like, and collects sounds around the head unit 12. Note that the microphone 20 may be disposed at a position other than the head unit 12.

The display unit 17 includes a known display panel such as a liquid crystal display panel, and displays various types of information under the control of the control device 30. The display unit 17 is provided on the front surface of the head unit 12, and thus displays various types of information on the front surface of the head unit 12. For example, as illustrated in FIG. 1, the display unit 17 displays a face image of the user U1 or a character image or the like in which the user U1 is deformed, so that a person (including another robot 10) near the robot 10 easily recognizes the user U1.

The speaker 21 emits, around the robot 10, various types of sounds such as the sound of voices of the user U1. The speaker 21 is attached to, for example, the front surface of the head unit 12, and emits the sound of voices ahead of the head unit 12. Note that the speaker 21 may be disposed at a position other than the head unit 12.

The head rotating actuator 22 is an actuator that rotates the head unit 12 laterally. For example, this head rotating actuator rotates the neck unit 16 laterally to integrally rotate the head unit 12 and the camera 13 laterally.

The head vertically moving actuator 23 is an actuator that moves the head unit 12 vertically. The head vertically moving actuator 23, for example, extends and contracts the neck unit 16 to move the head unit 12 and the camera 13 vertically. By moving the head unit 12 vertically, the height of the head unit 12 is changeable, and an action similar to a nodding action of a person is enabled.

The traveling unit actuator 24 is an actuator that causes the traveling unit 14 to travel forward, backward, leftward, and rightward. It is sufficient if a known mechanism including an electric motor, an electric cylinder, and the like is applied to the head rotating actuator 22, the head vertically moving actuator 23, and the traveling unit actuator 24. In addition, the configuration of moving the head unit 12 laterally and vertically is not limited to the above-described configuration, and various known structures may be applied.

The control device 30 includes a communication unit 31, an information acquisition unit 32, a control unit 35 including a display controller 33 and a drive controller 34, a storage unit 36 (memory), a position detection unit 37, and a surroundings recognition unit 38.

The communication unit 31 includes a communication module (transmitter/receiver, circuit) capable of communicating with the user terminal 50 using a wireless communication network. The control device 30 uses the communication unit 31 to acquire various instructions from the user terminal 50 given by the user U1, an image of the user U1 to be displayed on the display unit 17, the sound of voices of the user U1 to be output from the speaker 21, and the like. Further, the control device 30 uses the communication unit 31 to transmit data of an image captured by the camera 13 and sound data from the microphone 20 to the user terminal 50 of the user U1. This configuration enables the user U1 side to view the image and listen to the sounds around the robot 10.

The information acquisition unit 32 acquires data that has been received by the communication unit 31, the data of the image that has been captured by the camera 13, the sound data from the microphone 20, and the like. The information acquisition unit 32, under the control of the control unit 35, outputs the various types of data that have been acquired to each unit of the control device 30. In other words, the control unit 35 functions as the information acquisition unit 32. Accordingly, for example, data to be transmitted is output to the communication unit 31, data to be stored is output to the storage unit 36, and data to be used for detection or recognition is output to the surroundings recognition unit 38.

The display controller 33, under the control of the control unit 35, controls a display content of the display unit 17. For example, the display controller 33 causes the display unit 17 to display a real-time live image of the user U1 that has been acquired via the communication unit 31, or causes the display unit 17 to display a character image (for example, an avatar image of the user U1) that has been designated by the user U1.

The drive controller 34, under the control of the control unit 35, drives a drive unit included in the robot 10, that is, the speaker 21, the head rotating actuator 22, the head vertically moving actuator 23, the traveling unit actuator 24, and the like. The drive controller 34 causes the speaker 21 to output the sound of voices of the user U1 that have been received via the communication unit 31. This configuration enables the user U1 to talk to a person or the like around the robot 10. Further, as described above, the user U1 is able to view the image and listen to the sounds around the robot 10, and therefore the user U1 is also able to listen to the sound of voices from a person or the like around the robot 10. These configurations enable the user U1 to communicate with a person or the like around the robot 10.

Further, the drive controller 34 controls an action of the robot 10 by controlling the head rotating actuator 22, the head vertically moving actuator 23, and the traveling unit actuator 24, based on the data that has been received by the communication unit 31, the data of the image captured by the camera 13, the information from the surroundings recognition unit 38, and the information from the position detection unit 37. This configuration enables the head unit 12 of the robot 10 to move, and enables the robot 10 to move forward, backward, leftward, and rightward. In the present configuration, an operation screen is displayed on the user terminal 50, so that the user U1 uses the operation screen to operate the robot 10.

The control unit 35 is an electronic control unit (ECU) configured with a central processing unit (CPU), a peripheral circuit, and the like. The control unit 35 functions as a computer that centrally controls each unit of the robot 10.

For example, the control unit 35 uses the communication unit 31 to access the communication network 100 such as the Internet, acquires various types of information via the communication network 100, and makes various services available. By using a conference system service using the communication network 100, the user U1 is able to participate in an online conference or chat with another person via the robot 10.

The storage unit 36 stores various types of data used by the control unit 35. Specifically, the storage unit 36 stores a control program and the like to be read and executed by the control unit 35. The control program is a program for controlling each unit of the robot 10, and includes a program for conducting various types of control.

In addition, the storage unit 36 stores information defining the basic action of the robot 10, information for the user U1 to remotely operate the robot 10, and information for the robot 10 to travel autonomously.

The position detection unit 37 performs a process of detecting the current location of the robot 10. For example, the position detection unit 37 is a GPS sensor that detects the current location using a known technology using GPS, or a distance measurement sensor.

The surroundings recognition unit 38 is for recognizing the surroundings of the robot 10, and grasps the surrounding situation, based on the image captured by the camera 13. Note that, in addition to the camera 13, a radar, a sensor, or the like may be used in combination. For example, the control unit 35 functions as the surroundings recognition unit 38.

Regarding the robot 10, according to an operation of the user terminal 50 by the user U1, the traveling unit actuator 24 is controlled via the drive controller 34 of the robot 10, so that the traveling unit 14 can be driven to travel the robot 10 to any place.

In this case, the robot 10 is also capable of traveling inside various kinds of facilities 70, in addition to on an ordinary road.

Here, examples of the facilities 70 include indoor facilities such as museums and art galleries, and outdoor facilities such as sightseeing spots, zoos, theme parks, and parks.

Figure 3:
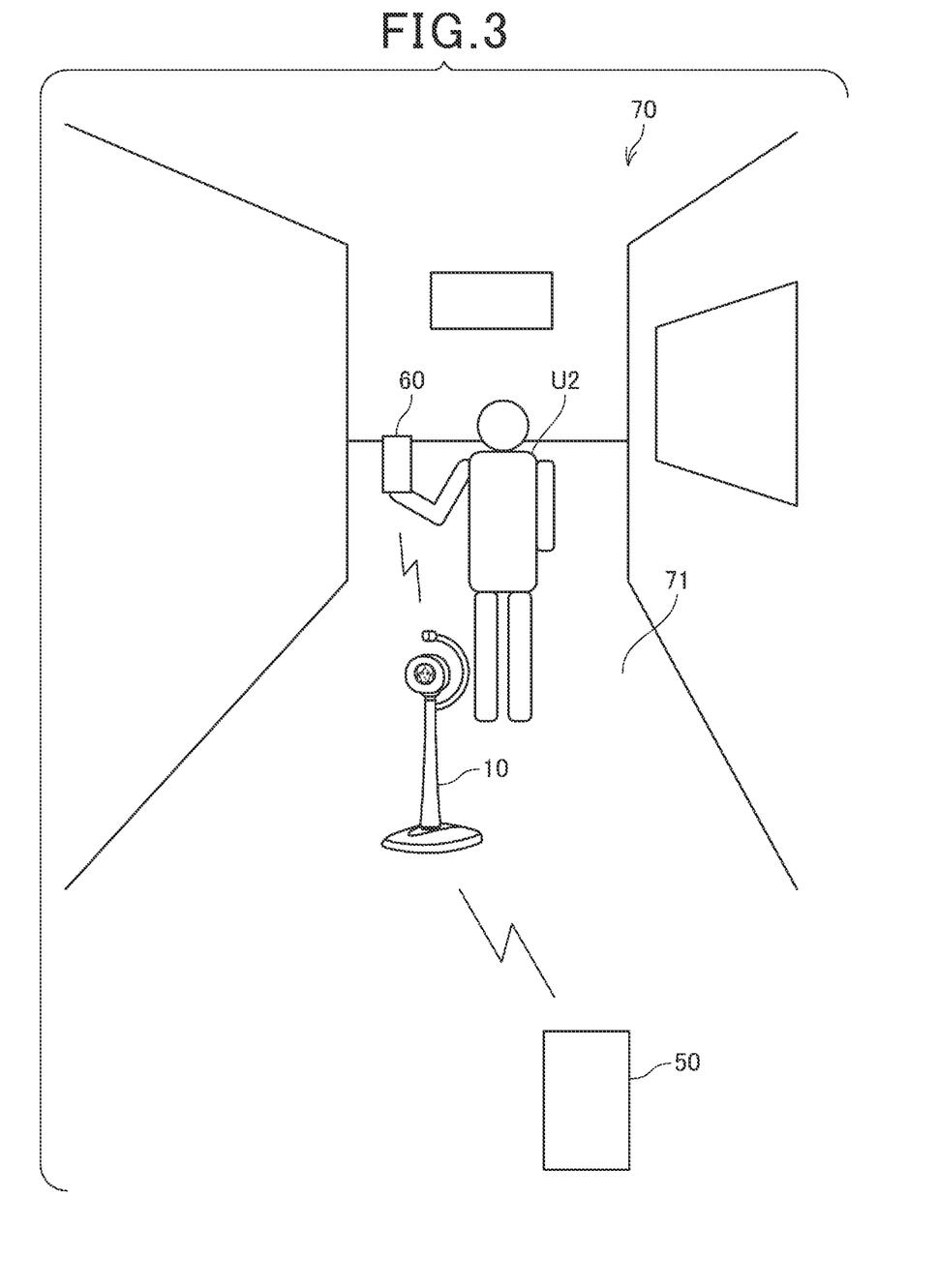
FIG. 3 is a diagram illustrating a state in which a facility user operates a robot in a facility in the present embodiment.

In a facility 70, a facility user U2 (another user) who is an administrator, a facility guide person, or the like of the facility 70 is present. The facility user U2 is able to operate a facility terminal 60 (a computer device such as a personal computer, a smartphone, or a tablet) in a similar manner to the user terminal 50 of the user U1. That is, the communication unit 31 of the robot 10 is also capable of communicating with the facility terminal 60 of the facility user U2, and is also capable of operating the robot 10 in accordance with an operation instruction of the facility terminal 60.

The facility user U2 has enough knowledge of exhibition items, highlights, a tour route, and the like in the inside of the facility 70, and the facility user U2 operates the robot 10 to enable the robot 10 to travel efficiently.

In this case, if the facility user U2 is enabled to operate the robot 10 while the user U1 is operating through the user terminal 50, the user U1 is not able to manage the robot 10, and in addition, the robot 10 may not be capable of determining which operation of the user terminal 50 or the facility terminal 60 should be prioritized.

For such a reason, in the present embodiment, when the facility user U2 operates the facility terminal 60 to operate the robot 10, the facility user U2 is able to give a terminal operation switching request to the user U1.

Next, control for switching the operation terminal between the user U1 and the facility user U2 will be described.

As illustrated in FIG. 2, the control device 30 is provided with an operation switching input unit 40. In other words, the control unit 35 functions as the operation switching input unit 40. In a case where the robot 10 is located in the predetermined facility 70, when the facility user U2, who is as a facility manager or a facility guide person present in the predetermined facility 70, requests a terminal operation switching request to the operation switching input unit 40, the control device 30 requests the user terminal 50 for an approval of switching the terminal operation.

Regarding the switching request of the terminal operation, for example, when the facility user U2 operates the facility terminal 60 managed by the facility user U2, a switching request signal is transmitted from the facility terminal 60 to the control device 30 via the communication unit 31, and the terminal operation switching request is given to the operation switching input unit 40.

Note that the facility user U2 may operate a switch that is operable from the outside of the robot 10 to give the terminal operation switching request.

When the terminal operation switching request is given to the operation switching input unit 40, the control unit 35 notifies the user terminal 50 via the communication unit 31 that there is the terminal operation switching request. When the switching request is notified, the user terminal 50 is caused to display that the switching request has been received.

The user U1 determines whether to approve the terminal operation switching request on the user terminal 50.

In a case where the user U1 approves the terminal operation switching request, the user U1 operates the user terminal 50 to transmit, to the robot 10, an instruction of approving the switching.

When the control device 30 receives the instruction of approving the switching via the communication unit 31, the control unit 35 notifies the facility terminal 60 of a switching approval result via the communication unit 31, and sets the facility terminal 60 as an operation terminal.

In this state, the control unit 35 controls the robot 10, based on an operation on the facility terminal 60.

Note that, in a case where the robot 10 is controlled based on the operation on the facility terminal 60, the facility terminal 60 may be capable of operating a plurality of robots 10. In this case, the plurality of robots 10 may act in collaboration (cooperation) with each other, or one robot 10 may be followed by another robot(s) 10 in traveling.

FIG. 3 is a diagram illustrating a state in which the facility user U2 operates the robot in the facility 70.

As illustrated in FIG. 3, by operating the facility terminal 60 so that the robot 10 travels in a predetermined passage 71, the control device 30 controls the traveling unit actuator 24 of the robot 10.

In addition, the image that has been captured by the camera 13 of the robot 10 is transmitted to the user terminal 50 via the communication unit 31, thereby enables the user U1 to visually recognize the image captured by the robot 10 via the user terminal 50.

That is, the robot 10 travels inside the facility 70, and thus enables the user U1 to visually recognize images of an exhibition item, a highlight, and the like in the facility 70.

In addition, the user U1 operates the user terminal 50 to give an operation instruction to the control device 30 so as to be able to drive the head rotating actuator 22 and the head vertically moving actuator 23 and to operate the direction and the height of the camera 13. In addition, the user U1 operates the user terminal 50 to give an operation instruction to the control device 30 so as to be also able to control a zoom adjustment, an exposure adjustment, and the like of the camera 13.

Accordingly, in the facility 70, the user U1 is able to direct the camera 13 to a location that the user U1 desires to view, and the user U1 is able to visually recognize a desired place freely in the facility 70.

In addition, the facility user U2 is able to give an explanation about an exhibition item, a highlight, and the like in the facility 70 via the microphone 20. When the sound of voices is acquired by the microphone 20 via the information acquisition unit 32, the control device 30 transmits sound information to the user terminal 50. The user U1 is able to view and listen to the explanation about the facility 70 with the sound information transmitted to the user terminal 50.

That is, through the robot 10, the user U1 becomes able to enjoy viewing and observing the inside of the facility 70 and the explanation about the facility 70.

Note that the facility terminal 60 of the facility user U2 may be registered beforehand in the storage unit 36 of the control device 30 of the robot 10, and may receive only the terminal operation switching request from the facility terminal 60 registered beforehand.

Further, for example, the image of the facility user U2 may be registered beforehand in the storage unit 36 of the control device 30, and the facility user U2 is recognized with an image captured by the camera 13, so that the facility user U2 and the facility terminal 60 may be confirmed to be proper.

Furthermore, an ID may be distributed to the facility user U2 or the facility terminal 60 beforehand, and the ID may be scanned by the camera 13 of the robot 10, so that the facility user U2 or the facility terminal 60 may be recognized or registered.

With this configuration, it is possible to prevent a non-registered terminal of a third party from operating the robot 10.

In addition, in the present embodiment, the robot 10 can be operated through the facility terminal 60. However, in addition to the operation on the facility terminal 60, the robot 10 may be switched to following control to follow the facility user U2 or another robot 10.

In this case, the control device 30 causes the camera 13 to capture an image of the facility user U2, and analyzes the captured image to recognize the facility user U2 or another robot 10.

In this situation, as described above, the image of the facility user U2 may be registered beforehand in the storage unit 36 of the control device 30, and the facility user U2 or another robot 10 may be recognized with the image captured by the camera 13 to confirm that the facility user U2 or another robot 10 are proper. Further, an ID that has been acquired beforehand by the facility user U2 or another robot 10 may be scanned, so that the facility user U2 or another robot 10 may be confirmed.

In a case where the control device 30 recognizes the facility user U2 or another robot 10, the control device 30 causes the information acquisition unit 32 to analyze the image captured by the camera 13, and causes the drive controller 34 to control the traveling unit actuator 24 based on an analysis result, so as to conduct traveling control to follow the facility user U2 or another robot 10 at a predetermined interval.

The following control to follow the facility user U2 or another robot 10 is conducted in this manner. The facility user U2 or another robot 10 moves along a predetermined place in the facility 70, for example, an exhibition item, a highlight, or the like in the facility 70, so as to be able to guide the robot 10 to a predetermined place in the facility 70. The user U1 is able to visually recognize a captured image captured by the camera 13 of the robot 10 or another robot 10 via the user terminal 50.

Then, when the facility user U2 cancels the operation switching of the facility terminal 60 on the operation switching input unit 40, the control device 30 ends the operation on the facility terminal 60, and automatically switches to the operation on the user terminal 50 of the user U1.

Next, a description will be given with regard to control in a case where an emergency occurs in the facility 70.

In the present embodiment, the control device 30 is provided with an emergency switch 41 for handling a case where an emergency, for example, a fire, an earthquake, or the like occurs in the facility 70.

Note that the emergency switch 41 may be provided in the facility terminal 60, in addition to the robot 10, or may be provided in a facility management unit (not illustrated) that integrally manages the robots 10 present in the facility 70.

When the emergency switch 41 is operated, the control device 30 causes the drive controller 34 to control driving of the traveling unit actuator 24 to shelter the robot 10 to a predetermined sheltering place.

In this case, when the emergency switch 41 is operated, all the robots 10 present in the corresponding facility 70 may be sheltered to the sheltering place.

The sheltering place is set to a place that does not disturb evacuation in an emergency situation in order to ensure an evacuation passage for evacuees present in the facility 70.

In this case, map information of an area or a facility where the robot 10 is present is registered beforehand in the facility terminal 60 or the like. In this map information, the positions of walls, passages, and other objects in the facility are registered in detail, and furthermore, the evacuation place and the evacuation route of the robot 10 at the time of an emergency are registered in the map information. The manager of the facility is able to optionally set the evacuation place and the evacuation passage in the map information.

As the evacuation place, for example, a place along a wall of the facility closest to the current location of the robot 10, an end of a passage, an end of a hall, or the like is conceivable.

When the emergency switch 41 is operated, the robot 10 travels autonomously from the current location to the evacuation place in accordance with the evacuation route of the map information that has been registered beforehand. The robot 10 holds a sheltering state at the predetermined evacuation place.

In a case where the robot 10 moves to the evacuation place in this manner, it is preferable to move along the flow of evacuees present in the facility moving in the evacuation passage.

In this situation, in a case where a plurality of robots move side by side in a row in the evacuation passage, evacuation of the evacuees may be disturbed. Therefore, it is desirable that, for example, the robots move sequentially in line in collaboration (cooperation) with another nearby robot.

Accordingly, when an emergency occurs, the robot 10 can be sheltered, and people can be smoothly evacuated.

As described heretofore, in the present embodiment, the robot 10 includes: the communication unit 31 that receives a remote operation instruction by the user terminal 50 of the user U1; the body unit 15 capable of traveling; the head unit 12 attached to the body unit 15 and capable of changing a direction; the camera 13 (image-capturing unit); the control unit 35 that controls the body unit 15, the head unit 12, and the camera 13, based on the operation instruction that has been received by the communication unit 31; and the operation switching input unit 40 that switches between the operation instruction by the user terminal 50 of the user U1 and an operation instruction by the facility terminal 60 (another user terminal) of the facility user U2 (another user), and when switching the operation instruction, the operation switching input unit 40 requests the user U1 for whether to approve user switching, and when the user U1 approves the user switching of the operation instruction via the user terminal 50, the operation switching input unit 40 switches the operation instruction by the user terminal 50 to the operation instruction by the facility terminal 60.

With this configuration, the approval of the user U1 is obtained when the operation instruction is switched to the facility terminal 60. Therefore, it is possible to prevent the operation instruction from being switched from the user U1 to the facility user U2 without permission. In addition, the facility user U2 is able to operate the facility terminal 60 in the facility 70. Therefore, the facility user U2, who has enough knowledge of the facility 70, can be made to operate the robot 10, so that the user U1 can view and observe the facility 70 via the robot 10 operated by the facility user U2.

Further, in the present embodiment, also in a case of switching to the operation instruction by the facility terminal 60 (another user terminal), the control unit 35 receives an action instruction for the head unit 12 by the facility terminal 60.

With this configuration, even while the facility user U2 is operating the robot 10, the user U1 is able to operate the head unit 12. Therefore, regardless of the operation of the facility user U2, the user U1 is able to select a place that the user U1 desires to view with the camera 13 provided on the head unit 12.

Further, in the present embodiment, in a case where the operation instruction is switched to the facility terminal 60 (another user terminal), the control unit 35 recognizes the facility user U2 (another user), based on a captured image that has been captured by the camera 13 (image-capturing unit), and controls traveling to follow the facility user U2.

With this configuration, the facility user U2 simply walks inside the facility 70, and is able to cause the robot 10 to travel to follow, without operating the facility terminal 60.

Further, in the present embodiment, the control unit 35 registers the facility user U2 beforehand, based on the captured image of the facility user U2 (another user) that has been captured by the camera 13 (image-capturing unit), and when the control unit 35 switches the operation instruction to the facility terminal 60 (another user terminal), in a case where the facility user U2 based on the captured image that has been captured by the camera 13 matches the facility user U2 that has been registered beforehand, the control unit controls traveling to follow the facility user U2.

With this configuration, it is possible to recognize whether the facility user U2 is registered beforehand from the captured image of the facility user U2 that has been captured by the camera 13 and to cause the robot 10 to travel to follow the facility user U2 registered beforehand.

Further, in the present embodiment, the control unit 35 reads an ID tag owned by the facility user U2 (another user), recognizes the facility user U2, and controls traveling to follow the facility user U2.

With this configuration, it is possible to recognize whether the facility user U2 is registered beforehand with the ID tag and to cause the robot 10 to travel to follow the facility user U2 registered beforehand.

Further, in the present embodiment, when the operation switching of the facility terminal 60 (another user terminal) is cancelled on the operation switching input unit 40, the control unit 35 ends an operation by the facility terminal 60, and automatically switches to an operation by the user terminal 50 of the user U1.

With this configuration, when the operation switching of the facility terminal 60 is canceled, the operation by the user terminal 50 can be immediately performed.

Further, in the present embodiment, the emergency switch 41 is further included, and when the emergency switch 41 is operated, the control unit 35 controls traveling autonomously to a predetermined sheltering place.

With this configuration, by operating the emergency switch 41, it is possible to shelter the robot 10 to a predetermined sheltering place and to prevent the robot 10 from obstructing evacuation of people at the time of an emergency.

Further, in the present embodiment, the control unit 35 acquires map information of the facility 70 beforehand, and the control unit 35 registers the sheltering place beforehand.

With this configuration, it is possible to shelter the robot 10, based on the map information of the facility 70.

Further, in the present embodiment, the control unit 35 sets the sheltering place along a wall closest to a current location.

With this configuration, the robot 10 is sheltered along the wall closest to the current location. Therefore, the robot 10 can be sheltered in a short time, and the shelter along the wall prevents the robot 10 from obstructing the evacuation of people.

The embodiment described above is merely an embodiment of the present invention, and can be optionally modified and applied without departing from the gist of the present invention.

REFERENCE SIGNS LIST 10 robot
11 robot main body
12 head unit
13 camera
14 traveling unit
15 body unit
16 neck unit
17 display unit
18 coupling member
20 microphone
21 speaker
22 head rotating actuator
23 head vertically moving actuator
24 traveling unit actuator
30 control device
31 communication unit
32 information acquisition unit
33 display controller
34 drive controller
35 control unit
36 storage unit
37 position detection unit
38 surroundings recognition unit
40 operation switching input unit
41 emergency switch
50 user terminal
60 facility terminal
70 facility
100 communication network
U1 user
U2 facility user

What is claimed is:

1. A robot that travels in a predetermined facility comprising:
a communication unit having a transmitter and a receiver, and that receives a remote operation instruction by one user terminal of an out-facility user outside the facility and an operation instruction by an in-facility user terminal of an in-facility user inside the facility;
a body unit having a traveling actuator for traveling;
a head unit attached to the body unit and including a rotating actuator for rotating the head unit left and right with respect to the body unit, and a vertically moving actuator for moving the head unit up and down with respect to the body unit;
a camera attached to the head unit; and
a processor that controls the body unit, the traveling actuator, the head unit, the rotating actuator, the vertically moving actuator, and the camera, based on at least one of the remote operation instruction and the operation instruction that has been received by the communication unit;
wherein the processor includes an operation switching input unit that switches between a control of the robot by the remote operation instruction by the one user terminal of the out-facility user and a control of the robot by the operation instruction by the in-facility user terminal of the in-facility user, wherein when switching the control of the robot from control by the remote operation instruction to control by the operation instruction, the operation switching input unit requests the out-facility user for whether to approve switching, and when the out-facility user approves the switching via the one user terminal, the operation switching input unit switches the control of the robot from control by the remote operation instruction to control by the operation instruction, wherein the processor, even after switching the control of the robot to the operation instruction by the in-facility user terminal, continuously receives the remote operation instruction from the one user terminal, and controls the rotating actuator and the vertically moving actuator to operate the head unit, based on the remote operation instruction from the one user terminal of the out-facility user, wherein the robot further includes a memory in which map information is stored in advance, in the map information, a plurality of sheltering places of the robot in emergency and a plurality of evacuation routes in emergency are registered, wherein the processor, when detecting that an emergency switch provided in the facility is operated, controls the robot, without obtaining approval of switching from the out-facility user, so that the robot travels autonomously from a current location to one of the plurality of sheltering places which is closest to the current location and is capable to move along a flow of evacuees present in the facility moving in the evacuation routes.

2. The robot according to claim 1, wherein
each of a plurality of robots comprises the processor,
each processor, in a case where the control of the robot is switched from control by the remote operation instruction to control by the operation instruction, controls the plurality of robots to act in cooperation with each other based on the operation instruction received from the in-facility user terminal of the in-facility user.

3. The robot according to claim 2, wherein the emergency switch is provided on each of the robots, when the emergency switch of one robot is operated, the processor controls so that another robot acts in cooperation to ensure the evacuation passage, travels autonomously to the one of the plurality of sheltering places while ensuring the evacuation passage, and holds a sheltering state at the sheltering place.

4. The robot according to claim 1, wherein, in a case where the control of the robot is switched from control by the remote operation instruction to control by the operation instruction, the processor recognizes either the in-facility user or another robot to travel to follow, based on a captured image that has been captured by the camera, and controls traveling to follow.

5. The robot according to claim 4, wherein
the processor registers either the in-facility user or the another robot beforehand, based on the captured image of either the in-facility user or the in-facility robot that has been captured by the camera, and
when the control of the robot is switched from control by the remote operation instruction to control by the operation instruction, in a case where either the in-facility user or the another robot based on the captured image that has been captured by the camera matches either the in-facility user or the another robot that has been registered beforehand, the processor controls traveling to follow either the in-facility user or the another robot.

6. The robot according to claim 4, wherein the processor reads an ID owned by either the in-facility user or the another robot to recognize either the in-facility user or the another robot, and controls traveling to follow either the in-facility user or the another robot.

7. The robot according to claim 1, wherein when the switching of the control of the robot from control by the remote operation instruction to control by the operation instruction is cancelled on the operation switching input unit, the processor ends an operation by the in-facility user terminal, and automatically switches to control by the remote operation instruction by the one user terminal of the out-facility user.

8. The robot according to claim 1, wherein the processor sets the one of the plurality of sheltering places along a wall closest to the current location.

* * * * *